United States Patent [19]

Chaffee

[11] Patent Number: 5,015,054
[45] Date of Patent: May 14, 1991

[54] APPARATUS AND METHOD FOR INCREASING THE BANDWIDTH OF A LASER BEAM

[75] Inventor: Paul H. Chaffee, Bolina, Calif.

[73] Assignee: The United States of America as represented by the Department of Energy, Washington, D.C.

[21] Appl. No.: 484,304

[22] Filed: Feb. 26, 1990

[51] Int. Cl.$^5$ ................................................ G02B 6/26
[52] U.S. Cl. ................................. 350/96.15; 307/425; 307/428; 350/96.3; 350/353; 350/354; 372/6; 372/21
[58] Field of Search .................... 372/106, 3, 6, 21, 26, 372/27; 350/96.15, 96.16, 96.29, 96.30, 353, 354; 307/430, 426, 425, 428

[56] References Cited

U.S. PATENT DOCUMENTS

| 3,297,875 | 1/1967 | Garwin et al. | 350/96.29 X |
| 3,537,020 | 10/1970 | Anderson | 307/425 X |
| 3,646,358 | 2/1972 | Firester | 307/425 |
| 3,875,422 | 4/1975 | Stolen | 307/430 X |
| 4,761,050 | 8/1988 | Byron | 350/96.15 |
| 4,784,450 | 11/1988 | Jain et al. | 307/430 X |
| 4,906,949 | 3/1990 | Pocholle et al. | 307/425 X |

OTHER PUBLICATIONS

Agrawal et al., "Optical Wave Breaking and Pulse Compression Due to Cross-Phase Modulation in Optical Fibers", Optics Letters, vol. 14, No. 2, Jan. 15, 1989, pp. 137-139.
Alfano et al., "Cross-Phase Modulation And Induced Focusing Due to Optical Nonlinearities in Optical Fibers and Bulk Materials", J. Opt. Soc. Am. B, vol. 6, No. 4, pp. 824-829, Feb. 1988.
R. R. Alfano et al., "Self-, Cross', and Induced-Phase Modulations of Ultrashort Laser Pulse Propagation", IEEE J. of Quantum Electronics, vol. 24, No. 2, pp. 351-364, Feb. 1988.
P. L. Baldeck et al., "Induced-Frequency Shift of Co-propagating Ultrafast Optical Pulses", Appl. Phys. Lett., vol. 52, No. 23, pp. 1939-1941, Jun. 6, 1988.
Chaffee et al., "Temporally Smooth Broadband Pulses Obtained by Cross-Phase Modulation in an Optical Fiber", UCRL-99999, Mar. 8, 1989.

(List continued on next page.)

*Primary Examiner*—Frank Gonzalez
*Assistant Examiner*—Galen J. Hansen
*Attorney, Agent, or Firm*—James D. McFarland; Roger S. Gaither; William R. Moser

[57] ABSTRACT

A method and apparatus is disclosed that provides a laser output beam having a broad bandwidth and an intensity smooth over time. The bandwidth of the laser output can be varied easily by varying the intensity of a broadband source. The present invention includes an optical modulation apparatus comprising a narrowband laser that outputs a horizontally polarized beam (a "signal beam") and a broadband laser that outputs a vertically polarized beam (a "pump beam") whose intensity varies rapidly. The two beam are coupled into a birefringent laser material so that the respective polarizations coincide with the principal axes of the material. As the two beams travel through the material, the polarization preserving properties of the birefringent material maintain the respective polarizations of the two beam; however there is coupling between the two beams as a result of cross phase modulations, which induces a bandwidth change of the signal beam. The amount of bandwidth change is dependent upon the average intensity of the pump beam. The beams are coupled out from the birefringent material and the modulated signal beam is separated by a polarization selector. The modulated signal beam now has a wider bandwidth, and its shape remains smooth in time. This signal beam can be applied to incoherence inducing systems. The different bandwidths required by these different incoherence inducing systems can be obtained by varying the intensity of the pump beam.

23 Claims, 2 Drawing Sheets

OTHER PUBLICATIONS

Islam et al., "Cross-Phase Modulation in Optical Fibers", Optics Lett., vol. 12, No. 8, pp. 625-627, Aug. 1987.

R. H. Lehmberg et al., "Use of Induced Spatial Incoherence for Uniform Illumination of Laser Fusion Targets", Optics Comm, vol. 46, No. 1, pp. 27-31, Jun. 1, 1983.

R. H. Lehmberg et al., "Theory of Induced Spatial Incoherence", J. Appl. Phys., vol. 62, No. 7, pp. 2680-2701, Oct. 1, 1987.

T. Morioka et al., "Demonstration of Chirping Manipulation of Laser Diode Chirped Optical Pulses Utilizing Cross-Phase Mod. in Optical Fibers," Elec. Lett., vol. 25, No. 10, pp. 646, 648, May 11, 1989.

Skupsky et al., "Improved Laser-Beam Uniformity Using the Angular Dispersion of Frequency-Modulated Light", J. Appl. Phys., vol. 66, No. 8, pp. 3456-3462, Oct. 15, 1989.

APPARATUS AND METHOD FOR INCREASING THE BANDWIDTH OF A LASER BEAM

The United States Government has rights in this invention pursuant to Contract No. W7405-ENG-48 between the United States Department of Energy and the University of California for the operation of Lawrence Livermore National Laboratory.

BACKGROUND OF THE INVENTION

1. Field of the Invention

The present invention relates to modulation of radiation in optical fibers. More specifically, the present invention relates to production of temporally smooth broadband pulses of optical radiation by cross phase modulation of light in an optical fiber.

2. Description of Related Art

The word "laser" is an acronym for "Light Amplification by Stimulated Emission of Radiation". Laser radiation has application in a wide variety of disciplines, such as communications, medicine, the military, research, and any other field where directed electromagnetic radiation is an advantage. The light produced from a laser has many known applications, and it is reasonable to expect that many applications of the laser have yet to be discovered. A typical laser comprises three basic elements: a resonating cavity, a gain medium, and a means to pump the gain medium.

The resonating cavity of a laser may comprise two or more opposed mirrors that reflect electromagnetic radiation (such as light). One of the mirrors typically has less than 100% reflectivity so that a portion of the light will be transmitted and the remainder will be reflected. The output of the laser passes through this mirror, which is sometimes termed the "output coupler". For example, an output coupler may have 90% reflectivity, which means that 10% of the incident optical energy will be transmitted, and the remainder (90%) will be reflected.

The gain medium of a laser may comprise any of a variety of materials: solid materials such as Nd:YAG or Er:YAG, gases such as KrF, $CO_2$ or $Ar^+$, and liquids such as dye. The gain material absorbs energy from the pump, storing that energy in the form of higher energy states in the molecular or sub-atomic level.

Due to the smallness of the optical wavelengths, a simple laser cavity such as that described above can support oscillation at many different wavelengths. A laser cavity resonator may oscillate simultaneously at several wavelengths, and in several "temporal modes", or oscillation may alternate between one or more of the modes competing for the gain of the laser. The spectral content of such a laser is irregular; the bandwidth may be large but the intensity is principally divided among the several and sometimes thousands of modes of oscillations. The output pulse intensity from such a multimode, broadband laser is typically characterized by a highly modulated, rapidly fluctuating shape. For many applications, an output at a single wavelength and mode is desirable, and much research is currently being devoted to design lasers whose output is exactly single wavelength. The lasers that come closest to a "single wavelength" oscillate in a single temporal and spatial mode and have a very narrow bandwidth around that single wavelength.

Very high power pulsed lasers may comprise a number of lasers or power amplifiers connected together. A "seed", or "master" oscillator generates a laser output which is provided to one or more power amplifiers. This configuration may be termed "MOPA" (Master Oscillator-Power Amplifier). The seed oscillator may provide a coherent beam (constant phase) of collimated light, or it may provide an incoherent beam (random phase) to the following power amplifiers.

If a coherent beam is desired, a master oscillator will produce light with a single wavelength and a single spatial mode which can be effectively amplified by the lasers or the power amplifiers. However, the master oscillator must produce a beam that is extremely coherent, both temporally and spatially, and single wavelength to a very high degree. If other wavelengths or modes are present in the output from the master oscillator, interaction between the various temporal and spatial modes by diffraction processes will lead to localized areas of intense radiation. These localized areas may lead to damage to components carrying that radiation if the intensity at that localized area is above the damage threshold of the component, such as amplifier material or mirrors or lenses. Therefore, high power lasers have been conventionally operated at an output intensity three or four times less than the damage threshold, to allow for the localized areas where the intensity may be greater. When a single-mode master oscillator is used, the laser can operate much closer to its damage threshold without damaging optical components. Use of a single-mode master oscillator with a smooth temporal pulse shape is common practice with high power laser systems such as the current solid state laser system at Lawrence Livermore National Laboratory called "NOVA".

If a high degree of coherence of the output beam is not required, incoherent light within the laser system may be advantageous. Since totally incoherent light has a random spatial and temporal phase, there are no diffraction or interference patterns formed. As a result, there would be no areas where the localized intensity may vary greatly from the average intensity, and thus the laser could operate close to its damage threshold.

However, using totally incoherent light in a high power laser amplifying chain is difficult because the amplified light will rapidly diverge as it propagates through the laser chain, which results in loss of power, loss of ability to focus, and other problems. In spite of these problems, significant applications exist for high power incoherent light. One such application is inertial confinement fusion, where total incoherence of laser light on target may provide significantly improved efficiency in coupling the beam to the target. Such an application requires that the output laser beam or beams be both spatially and temporally incoherent. In practice, temporal incoherence alone can be obtained by amplifying broadband laser light with a laser amplifier chain.

As discussed above, in a laser system each material through which the laser passes has a damage threshold which describes the peak electric field amplitude or intensity of the laser pulse that can pass through the system without damage to the components. Average power output from the laser is severely limited by rapid intensity fluctuations. Therefore, to avoid damage to the components while increasing average output power, time fluctuations in intensity should be minimized. Minimizing (i.e., smoothing) the peak intensity fluctuations of a temporally incoherent pulse over time can provide a high average power to the target, because the pulse can propagate through the system at an average intensity just below the damage threshold.

Additionally, spatial incoherence of the light is required for certain target irradiation experiments related to laser-driven inertial confinement fusion (ICF) of deuterium and deuterium/tritium filled spherical target shells. It is now understood in the ICF field that laser irradiation non-uniformity on targets must be less than a 1% root-mean-squared (rms) deviation from the average intensity over the target surface. Focussed radiation from today's solid-state or gas laser systems can not achieve this degree of intensity uniformity on target. In addition, local laser radiation "hot-spots" on the target can cause many undesirable light scattering instabilities in the under-dense coronal plasma surrounding the target sphere. These plasma instabilities cause severe scattering of the incoming laser light away from the target, causing further radiation and plasma nonuniformities, thereby preventing target compression and nuclear fusion.

Therefore, conversion of high power laser systems with coherent beams into target irradiation sources that can direct incoherent light onto target is highly desirable in the ICF field.

Various systems have been developed at major laboratories for converting a pulse of coherent light into a pulse of incoherent light. These systems require that the pulse have a certain finite bandwidth for optimal incoherence conversion. Each system has different bandwidth requirements. For example, a system developed at the University of Rochester-Smoothing by Spectral Dispersion (SSD)—requires a 2 Å to 4 Åbandwidth (FWHM), while a system developed at the Naval Research Labs-Induced Spatial Incoherence (ISI)—requires a 20 Å to 30 Å bandwidth (FWHM). The ISI system is described in an article by R. H. Lehmberg and S. P. Obenschain, "Use of Induced spatial Incoherence for Uniform Illumination of Laser Fusion Targets", Optics Communications, Vol. 46, No. 1, June 1, 1983, pp. 27-31, and in another article by Lehmberg, et al., "Theory of Induced Spatial Incoherence", J. Appl. Phys. Vol. 62, No. 7, Oct. 1, 1987, pp. 2680-2701. The SSD system is described in an article by Skupsky, et al., "Improved Laser-Beam Uniformity Using the Angular Dispersion of Frequency-Modulated Light", J. Appl. Phys. Vol. 66, No. 8, Oct. 15, 1989, pp. 3456-3462.

It would be advantageous to have a laser system that can provide a specific bandwidth reliably and conveniently while maintaining a smooth temporal pulse shape. Furthermore, it would be an advantage if a single laser system were available that could be adjusted to provide any of a number of bandwidths, such as 2 Å, 4 Å or 20 Å. For research using these and other methods, it is desirable to be able to conveniently and continuously vary the bandwidth of the pulse.

For other applications, such as laser pulse compression, it is desirable to have a pulse that has a broad bandwidth while retaining a single temporal and spatial mode. It is advantageous if the pulse has a spectral content that is approximately evenly distributed around the central wavelength. It is a further advantage if the pulse's intensity varies smoothly in time, for safe laser operation at high power.

A wide bandwidth means a wide variation from the pulse's center wavelength. A temporally smooth pulse has an intensity as a function of time that does not change abruptly. Such a temporally smooth pulse has an average intensity that is typically close to the peak intensity of the pulse.

The initial pulse to the NOVA laser amplifiers is produced in a master oscillator system. The pulse is then amplified in several amplifier stages through which it is passes. Then, the amplified pulse may be frequency doubled or tripled in nonlinear crystals before it is focussed on a target. The present invention may be included as a portion of a master oscillator system for a laser that has a master oscillator-power amplifier (MOPA) configuration.

SUMMARY OF THE INVENTION

The present invention comprises a novel method and apparatus that provides a laser output beam having a broad bandwidth and an intensity smooth over time. As a further advantage, the present invention provides a simple means for varying the bandwidth by linearly varying the intensity of a noisy broadband source. In the preferred embodiment, the present invention provides a broad bandwidth pulse of laser light that has an average intensity close to its peak intensity.

The present invention includes an optical modulation apparatus that comprises a narrowband laser having a horizontal polarization and a broadband laser having a vertical polarization whose intensity varies rapidly. The two beams are coupled into a birefringent optical material along the principal axes of the material. Specifically, the narrowband laser output (the "signal beam") is coupled into the material at a first principal axis, and the broadband laser output (the "pump beam") is coupled into the material at the second principal axis. As the two beams travel through the material, the polarization preserving properties of the birefringent material maintain the respective polarizations of the two beams; however there is coupling between the two beams as a result of third order variations in the index of refraction. As a result of this coupling, the phase of the signal beam is affected by the intensity of the pump beam; the rapidly varying nature of the intensity variations induces a bandwidth change of the signal beam. The amount of bandwidth change is dependent upon the average intensity of the pump beam.

At an exit from the birefringent material, the beams are coupled out and the modulated signal beam separated by a polarization selector, so that the polarization selected corresponds to the first principal axis of the birefringent material. The modulated signal beam now has a wider bandwidth, and its shape remains smooth in time. This signal beam can be applied to coherence reducing systems such as the Rochester system—Smoothing by Spectral Dispersion (SSD), or the Naval Research Labs system—Induced Spatial Incoherence (ISI). The different bandwidths required by these different incoherence inducing systems can be obtained by varying the intensity of the pump beam.

The present invention has application in any laser system having a MOPA configuration, such as high-power laser systems. Furthermore, the optical cross-phase modulation method may have application in communications, providing a means for rapidly modulating laser radiation so that more information can be transmitted in a single link than possible previously.

DETAILED DESCRIPTION OF THE INVENTION

The invention is best understood by reference to the figures wherein like parts are designated with like numerals throughout.

GENERAL DESCRIPTION

Figure 1:
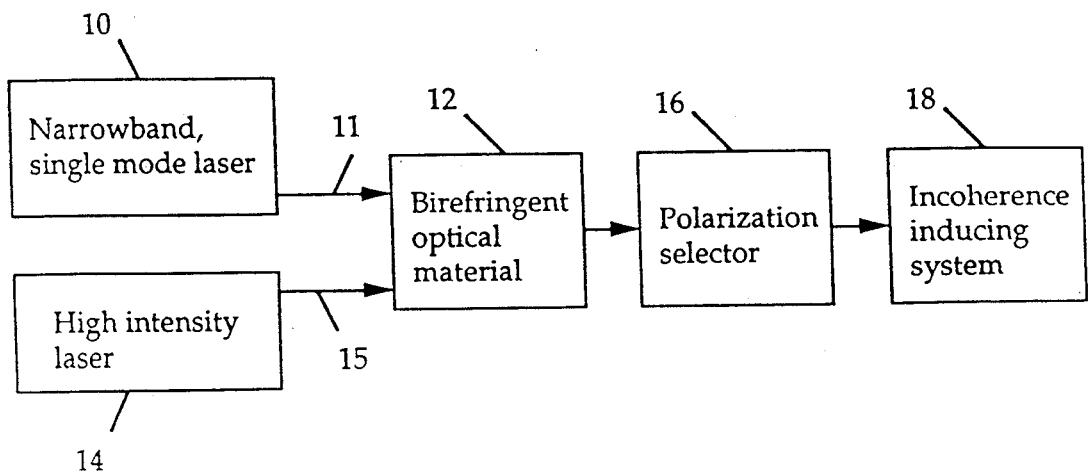
FIG. 1 is a block diagram of the present invention.

In general, the present invention teaches a method for modulating laser light in an optical fiber. As shown in FIG. 1, laser light from a narrowband, single mode laser 10 (the "signal" or "probe" beam 11) with a single polarization is coupled into a birefringent optical material 12, for example an optical fiber of glass or crystalline material having polarization preserving properties. Another source 14 produces broadband laser light (the "modulating" or "pump" beam 15) with a higher intensity, which is coupled into the optical material 12 at a polarization orthogonal to the polarization of the narrowband light 11. As the beams 11,15 travel through the material 12, their respective polarization is preserved due to inherent properties of the birefringent material 12. Furthermore, the two laser beams 11,15 couple in the material 12 by cross-phase modulation, and therefore the signal beam 11 is modulated by the modulating beam 15. After its output, the polarization of the signal beam 11 is isolated by a polarization selector 16, for example a polarized filter.

Figure 4:
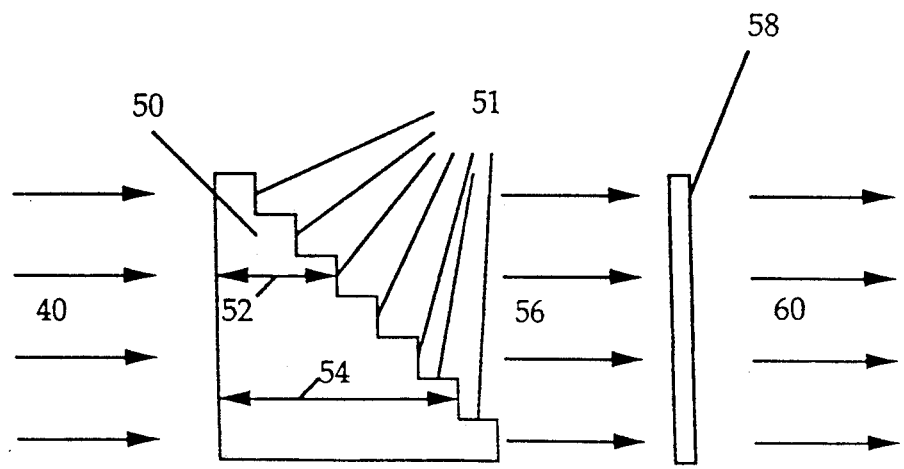
FIG. 4 illustrates an optical system for producing incoherent light.

Cross phase modulation is an effect whereby intensity variations in the modulating beam 15 directly affect the signal beam 11. Specifically, these intensity variations in the beam 15 cause phase variations of the signal beam 11. In the preferred embodiment, the large number of phase variations induced by the noisy, broadband modulating beam 15 change the bandwidth of the signal beam 11. Thus, by increasing the peak intensities of the modulating beam 15, a linear increase in the bandwidth is caused in the signal beam 11. Upon its exit from the optical material 12, the broadened bandwidth signal beam 11 can be applied to a system 18 for reducing spatial coherence, such as the ISI, or SSD, to provide a spatially incoherent beam that has a smooth intensity variation over time. FIG. 4 illustrates a simple system for reducing coherence.

SPECIFIC DESCRIPTION

Figure 2:
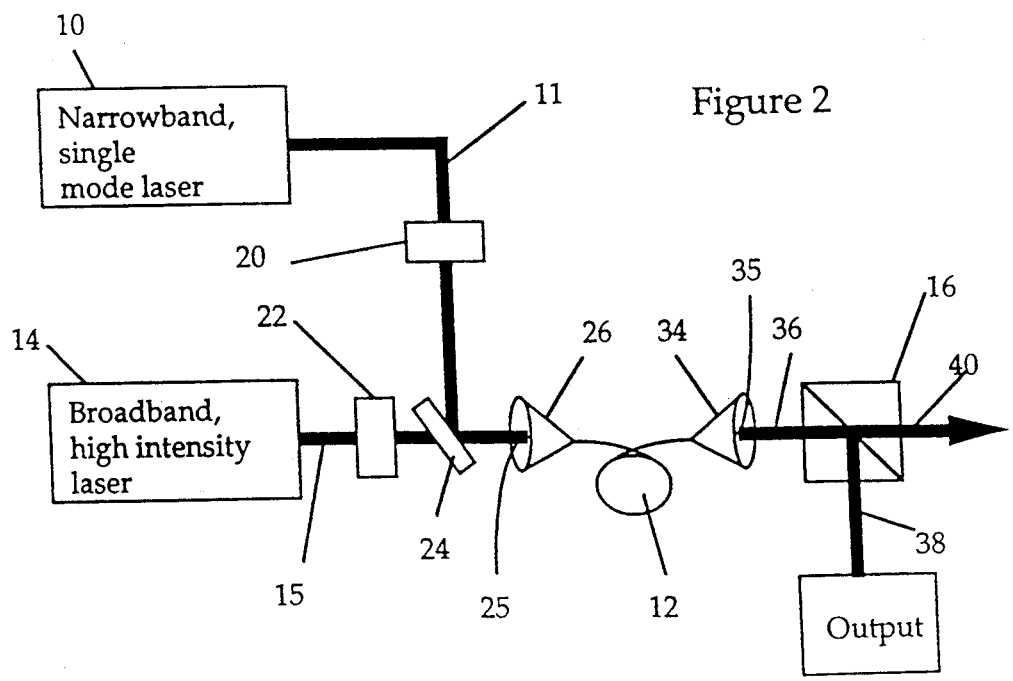
FIG. 2 illustrates an embodiment of the present invention that comprises an optical system having an output that is cross-phase modulated.

The preferred embodiment of the present invention is illustrated in FIG. 2. The narrowband, single mode pulsed laser 10 in the preferred embodiment comprises a conventional design that preferably includes cavity mirrors, an intracavity acousto-optic Q-switch, one or more intracavity etalon elements, and a flashlamp pumped laser rod of neodymium-doped Yttrium Lanthanum Fluoride (Nd:YLF). Preferably, the signal beam 11 is single frequency with a FWHM of less than 100 MHz. As they exit the laser 10, the pulses of the signal beam 11 have a single linear polarization. After exiting from the laser 10, the pulse intensity of the signal beam 11 is preferably controlled by a pulse slicer 20, which comprises a conventional Pockel's cell driven by a square wave electrical pulse that is provided by a conventional electric circuit. The pulse slicer 20 has purposes including limiting the signal pulse duration and/or shaping the time envelope of the signal pulse 11.

The broadband, high intensity pulsed laser 14 in the preferred embodiment comprises a conventional design that preferably includes cavity mirrors, an intracavity Q-switch, and a flashlamp-pumped laser rod of neodymium-doped phosphate glass (Nd:glass). As it exits the laser 14, the pulses of the pump beam 15 have a single linear polarization. Preferably, the pump beam 15 is noisy with a bandwidth exceeding 30 GHz around a single frequency. Also preferably, the beams 11,15 have a wavelength that is similar, within 50 Å, so that the two beams 11,15 couple efficiently in the optically birefringent material 12. After exiting from the laser 14, the intensity of the pulses in the signal beam 15 is preferably controlled by a second pulse slicer 22, which comprises a conventional Pockel's cell driven by a square electrical pulse. In operation, the pulse slicers 20,22 are synchronized by a conventional electronic timing control system, so that the signal beam 11 and the pump beam 15 can co-propagate through subsequent optical components. In the preferred embodiment, the lasers 10,14 are operated in the pulsed mode as a result of design constraints imposed by the solid state laser material. However, the principles of the present invention can be applied with continuously operating (cw) lasers, and therefore in other embodiments, one or both of the lasers 10,14 may comprise a cw laser.

Figure 3:
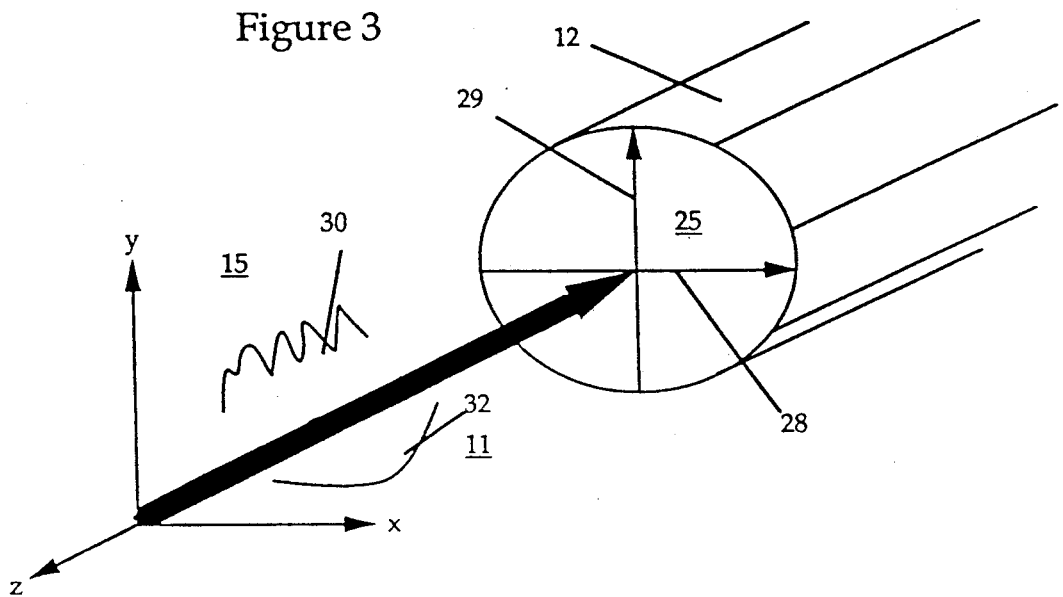
FIG. 3 illustrates a beam coupling into an optical fiber, illustrating the polarization of the beam components and their relationship to the optical fiber.

The pump beam 15 and the signal beam 11 are combined in a conventional beamsplitter 24 such as a thin dielectric film polarizer and then coupled into an entrance 25 of the material 12 by a conventional coupler 26, such as a microscopic lens. FIG. 3 illustrates the respective polarizations of the two beams 11,15 in the relationship that they are coupled into the entrance 25 of the birefringent material 12. As illustrated, the x-axis corresponds to a first principal axis 28 of the birefringent material 12, and the y-axis corresponds to the second principal axis 29 of the birefringent material 12. The propagation direction of the two combined beams 11,15 lies along the z-axis. The polarization of the pump beam 15 is linear, in the yz plane, and a graphical depiction of the randomly varying electric field is illustrated at 30. The polarization of the signal beam 11 is also linear, but in the xz plane. A graphical depiction of the smoothly varying shape of the electric field of the signal beam 11 is illustrated as 32. Therefore, the pump beam 15 is coupled into the material 12 along the polarization corresponding to the second principal axis 29, and the signal beam 11 is coupled into the material 12 along the polarization corresponding to the first principal axis 28.

In the preferred embodiment, an orthogonal physical relationship exists between the polarizations of the beams 11,15 coupled into the material 12. The orthogonality of the polarizations corresponds to the orthogonal principal axes of the polarization preserving fiber. However, in other embodiments the birefringent material 12 may comprise non-orthogonal principal axes, and therefore the physical relationship between the polarizations of the beams 11,15 would change to correspond to these axes.

The amount of coupling between the pump beam 15 and the signal beam 11 is partially determined by their interaction length. Thus, the optically birefringent material 12 has a length chosen so that a sufficient strength of cross-phase modulation is obtained during the optical interaction of the pump beam 15 and the signal beam 11 in the material 12. The birefringent material 12 may comprise an optical fiber, or another media for nonlinear optical interaction. In the preferred embodiment, the birefringent material 12 includes a polarization-preserving optical fiber having a length of five to ten meters; the actual length is a design consideration that is dependent upon criteria such as material properties and the average intensity of the pump beam 15.

In the preferred embodiment, the center wavelength of the pump beam 15 is similar to the center wavelength of the signal beam 11. If in other embodiments a wavelength dissimilarity were to exist, one pulse or the other may travel substantially faster through the birefringent material 12, and the pulses in the beams 11,15 would tend to "walk away" from each other as they travel through the material 12. In these other embodiments of dissimilar wavelengths, some coupling would occur although with less efficiency. In the preferred embodiment, the beams 11,15 have a similar wavelength, within 50 Å, so that the pulses in the beams 11,15 interact over their entire length. The coupling between the pump beam 15 and the signal beam 11 is sometimes referred to as the "optical Kerr effect". Rapid-in-time intensity variations in the modulating pump beam 15 produce corresponding index of refraction variations in the material 12. These index variations affect an entire cross-section of the material 12, not the section along the linear polarization of the pump beam 15. The variations in the index of refraction appear as a result of third order refractive index nonlinearities in the birefringent material 12. Thus, the index of refraction variations couple the pump beam 15 to the signal beam 11 although it is propagating in the orthogonal polarization state.

The induced index of refraction variations on the signal beam 11 give rise to phase modulation of the electric field envelope of the signal beam 11, and are linearly proportional to the degree of intensity variation of the modulating beam 15. The phase variations in the signal beam 11 have the effect of increasing its bandwidth, among other effects. Theoretically, the temporal envelope of the signal beam 11 is unaffected in the preferred embodiment, because the interaction between the beams 11,15 is phase modulation, and not amplitude modulation. The modulated signal beam 11 can maintain a single temporal mode and smooth-in-time temporal variation, even while carrying substantial phase-induced bandwidth and temporal incoherence. For effective cross-phase modulation, the pump beam 15 and the signal beam 11 need not be close in wavelength. However in the preferred embodiment, the wavelengths are closely matched in order to provide an optimum cross-phase modulation between the signal beam 11 and the pump beam 15.

In the preferred embodiment, an increase in the average power of the "noisy" broadband pump beam causes a linear increase in the overall bandwidth of the signal beam 11. To vary the intensity of the pump beam 15, it may be advantageous to position a polarizer and waveplate between the broadband laser 14 and the pulse slicer 22. With such a arrangement, the intensity of the pump beam 15 can be easily varied by rotating the waveplate.

At an exit 35 from the birefringent material 12, the modulated beam is coupled out of the material 12 by a conventional optical coupler 34, such as a microscope objective lens. The combined beam 36 which is coupled out comprises a modulated signal beam 38 and a modulated pump beam 40. The respective polarizations of the beams 38,40 have been maintained in accordance with their original coupling into the material 14 by the polarization preserving effects of the birefringent material 12. The combined beam 36 is applied to a polarization selector 16 such as a thin dielectric film polarizer, and the modulated signal beam 38 exits from one angle while the pump beam 40 exits from another angle. Thus, the modulated signal beam 38 is available for further purposes as needed. For example, the modulated signal beam 38 can be amplified in a high power laser chain.

In the preferred embodiment, the modulated signal beam 38 has a large bandwidth with an smooth spectral content, and a shape over time that is smoothly varying in intensity. The modulated signal beam 38 can thus be applied to a system for inducing spatial incoherence, such as the above mentioned ISI and SSD systems.

Following processing into a temporally incoherent form, the pulses in the modulated signal beam 38 may be used as desired. For example, a pulse can be used as the seed pulse for a high-power laser such as the NOVA laser system. As another example, the pulses in the beam 38 may be applied to beam compression, using dispersive elements in a configuration to provide short, high power pulses.

The principles of the present invention may be applied to phase modulate a narrowband laser beam in a manner that is periodic, or aperiodic, or random by any another laser beam, regardless of the frequency (color) of the beam or the frequency of its intensity variations. For example two temporal modes of the broadband oscillator might be generated of equal amplitude by applying the appropriate etalon elements within the oscillator cavity. This will give rise to a periodic intensity modulation in the 100 MHz to multi GHz range, which when used as the modulating pump source for cross-phase modulation will generate a wideband, discrete wavelength spectrum with Bessel function amplitude on the signal laser beam. This spectral format will also have application with spatial incoherence inducing techniques such as ISI or SSD. Phase modulating a narrowband cw signal beam 11 with a periodic or aperiodic sequence of picosecond duration pump pulses can also be envisioned as a way of data encoding.

FIG. 4 illustrates a simple coherence reducing system. The modulated signal beam 40 is processed by an echelon element 50 that causes a time delay between different positions of the beam. The echelon element 50 may comprise a material of constant refractive index that has a series of steps 51. These steps cause the beam pathlength to differ; it can be seen that the pathlength 52 is shorter than the pathlength 54. Thus, the portion of the beam 40 travelling the pathlength 52 is delayed less that the portion travelling the pathlength 54. The time-delayed beam 56 is then applied to a phase scrambling element 58, such as a distributed phase plate described in the Skupsky article cited previously. The phase scrambling element 58 causes a random change in the phase of the beam. As a result of the phase scrambling element 58 and the echelon 50, an output 60 is highly incoherent. In other embodiments, the echelon element 50 may comprise reflective surfaces positioned to provide similar time delays.

In further embodiments of the present invention, the capability exists to modulate the narrowband laser beam 11 with other information, such as another pump beam having a high frequency or data rate. Using this capability, communications across a single link could proceed at a very fast rate, possibly greater than 10 Gigabits per second. Because the major cost in many systems is the communication link, the present invention with technology development could provide a way to reduce these costs. Specifically, the cross modulation method may have application in communications, providing a means for modulating laser radiation so that more information can be transmitted in a single link than possible previously.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

I claim:

1. An optical modulation apparatus, comprising:
   a first laser having a narrowband beam output;
   a second laser having a broadband beam output;
   a birefringent optical material having a first principal axis and a second principal axis extending from an optical entrance to an optical exit;
   a means for coupling a single polarization of the narrowband laser beam into the entrance of the birefringent optical material along the first principal axis;
   a means for coupling a single polarization of the broadband laser beam into the entrance of the birefringent laser material along the second principal axis;
   a means for coupling an output beam from the exit of the birefringent optical material; and,
   a means for selecting a single polarization of the output beam from the optical material, so that the polarization selected corresponds to the first principal axis of the optical material.

2. The optical modulation apparatus as claimed in claim 1, wherein the birefringent optical material comprises a polarization preserving optical fiber.

3. The optical modulation apparatus as claimed in claim 1, wherein the intensity of the broadband beam that is coupled into the birefringent optical material is substantially greater than the intensity of the narrowband beam that is coupled into the birefringent optical material.

4. The optical modulation apparatus as claimed in claim 1, wherein the first laser and the second laser are pulsed lasers, and wherein the apparatus further comprises means for synchronizing the pulses coupled into the birefringent optical material so that they travel though said material approximately simultaneously.

5. The optical modulation apparatus as claimed in claim 1, wherein the center wavelength of the first laser output and the center wavelength of the second laser output differ by less than 50 Å.

6. The optical modulation apparatus as claimed in claim 1, wherein the selected polarization of the output beam comprises a modulated signal beam.

7. The optical modulation apparatus as claimed in claim 6, wherein the modulated signal beam is applied to a coherence reducing system which provides an output that is spatially and temporally incoherent.

8. An optical modulation apparatus, comprising:
   a first laser having a narrowband signal beam output that is linearly polarized along a horizontal axis;
   a second laser having a pump beam output that is linearly polarized along a vertical axis;
   a beamsplitter for combining the signal beam and the pump beam into a single beam while maintaining their respective polarizations;
   a birefringent optical material having a first principal axis and a second principal axis extending from an optical entrance to an optical exit;
   a coupler for coupling said single beam into the entrance of the birefringent optical material so that the horizontal polarization of the beam is coupled in along the first principal axis of the optical material, and the vertical polarization of the beam is coupled in along the second principal axis of the beam;
   an output coupler for coupling the modulated combined beam from the exit of the birefringent optical material; and,
   a polarizer positioned in the modulated combined beam to select the polarization of the modulated signal beam, so that the modulated signal beam is provided as an output substantially separate from the pump beam.

9. The optical modulation apparatus as claimed in claim 8, wherein the birefringent optical material comprises a length of optical fiber.

10. The optical modulation apparatus as claimed in claim 8, wherein the second laser has an output that has a rapidly varying intensity with an average value substantially higher than the average output intensity of the first laser.

11. The optical modulation apparatus as claimed in claim 8, wherein the center wavelength of the first laser output and the center wavelength of the second laser output differ by less than 50 Å.

12. The optical modulation apparatus as claimed in claim 8, wherein the first laser and the second laser are operated in a pulsed mode.

13. The optical modulation apparatus as claimed in claim 12, further comprising means for synchronizing the pulses from the first and the second lasers so that the pulses propagate substantially simultaneously through the optical material.

14. The optical modulation apparatus as claimed in claim 13, wherein the synchronizing means comprises a first pulse slicer positioned in the beam path between the first laser and the beamsplitter, and a second pulse slicer positioned in the beam path between the second laser and the beamsplitter.

15. A method of producing broadband laser light from a narrowband source of laser light, comprising the steps of:
   first, providing a birefringent optical material having a first optical axis and a second optical axis;
   second, producing a narrowband signal beam and coupling it into the birefringent material along the first axis;
   third, substantially simultaneously with the second step, producing a broadband pump beam and coupling it into the birefringent material along the second axis; and,
   fourth, separating the output beam from the birefringent material along the polarization corresponding to the first optical axis of the birefringent laser material, to provide an output that is a modulated signal beam.

16. The method as claimed in claim 15, wherein the narrowband signal beam is pulsed before it is coupled into the birefringent material.

17. The method as claimed in claim 15, wherein the broadband band pump beam is pulsed before it is coupled into the birefringent material.

18. The method as claimed in claim 15, wherein the narrowband signal beam is pulsed before it is coupled into the birefringent material and the broadband band pump beam is pulsed before it is coupled into the birefringent material, and wherein the pulses of the signal beam and the pump beam are synchronized so that they are coupled substantially simultaneously into the birefringent material.

19. The method as claimed in claim 15 wherein the intensity of the broadband pump beam is selectable so that the FWHM bandwidth of the modulated signal beam can be varied.

20. The method as claimed in claim 19 wherein the intensity of the broadband pump beam is selected so that the FWHM bandwidth of the modulated signal beam has a value between 2 Å and 4 Å.

21. The method as claimed in claim 20, further comprising a fifth step wherein the modulated signal beam is applied to a Smoothing by Spectral Dispersion system to produce a beam with reduced spatial coherence.

22. The method as claimed in claim 19 wherein the intensity of the broadband pump beam is selected so that the FWHM bandwidth of the modulated signal beam has a value between 20 Å and 30 Å.

23. The method as claimed in claim 20, further comprising a fifth step wherein the modulated signal beam is applied to an Induced Spatial Incoherence system to produce a beam with reduced spatial coherence.

* * * * *

UNITED STATES PATENT AND TRADEMARK OFFICE
CERTIFICATE OF CORRECTION

PATENT NO. : 5,015,054
DATED : May 14, 1991
INVENTOR(S) : Paul H. Chaffee, Mark A. Henesian, Frank G. Patterson It is certified that error appears in the above-identified patent and that said Letters Patent is hereby corrected as shown below:

On the title page:

[75] "Inventor: Paul H. Chaffee, Bolina, Calif." should read
--Inventor: Paul H. Chaffee, Bolina, Calif; Mark A. Henesian, Livermore, Calif.; Frank G. Patterson, Livermore, Calif.--

Signed and Sealed this

Twentieth Day of October, 1992

Attest:

DOUGLAS B. COMER

Attesting Officer

Acting Commissioner of Patents and Trademarks